United States Patent
Ohba

[11] Patent Number: 6,031,809
[45] Date of Patent: Feb. 29, 2000

[54] APERTURE-LIMITING ELEMENT AND OPTICAL HEAD UTILIZING THE SAME

[75] Inventor: Akitomo Ohba, Tokyo, Japan

[73] Assignee: NEC Corporation, Tokyo, Japan

[21] Appl. No.: 08/986,181

[22] Filed: Dec. 5, 1997

[30] Foreign Application Priority Data

Dec. 6, 1996 [JP] Japan .................................. 8-326765

[51] Int. Cl.⁷ ............................................ G11B 7/00
[52] U.S. Cl. .................. 369/112; 359/316; 359/573; 359/575; 359/894
[58] Field of Search ................. 369/44.23, 44.24, 369/12; 359/315–316, 573, 575, 576, 894

[56] References Cited

U.S. PATENT DOCUMENTS

| | | | |
|---|---|---|---|
| 3,787,111 | 1/1974 | Giordmaine et al. | 359/315 |
| 5,093,747 | 3/1992 | Dorschner | 359/316 |
| 5,748,603 | 5/1998 | Kim et al. | 369/112 |
| 5,793,734 | 8/1998 | Tsuchiya et al. | 369/112 |
| 5,793,735 | 8/1998 | Oono | 369/116 |
| 5,798,994 | 8/1998 | Kamatani | 369/58 |
| 5,859,818 | 1/1999 | Tateishi et al. | 369/44.32 |
| 5,901,131 | 5/1999 | Ootaki et al. | 369/112 |

FOREIGN PATENT DOCUMENTS

| | | |
|---|---|---|
| 2-287226 | 11/1990 | Japan . |
| 5-242520 | 9/1993 | Japan . |

OTHER PUBLICATIONS

Nikkei Electronics, No. 654, Jan. 29, 1996, pp. 15–16.
Nikkei Mechanical, No. 47, Feb. 5, 1996, p. 16.

*Primary Examiner*—W. R. Young

[57] ABSTRACT

The optical head has a light source, a collimating lens, an aperture-limiting element and an objective lens in the mentioned order in the direction of progress of light emitted from the light source, and a photo-detecting system for detecting return light having been transmitted through the objective lens and reflected by an optical disk. The aperture-limiting element includes a plurality of stripe transparent electrodes spaced apart at a predetermined interval on an electro-optical crystal substrate, and a substantially circular non-electrode area lacking the stripe transparent electrodes at a center portion of the substrate. The aperture-limiting element can be constructed with a reduced number of components as compared with the prior art construction.

8 Claims, 7 Drawing Sheets

PRIOR ART

PRIOR ART

APERTURE-LIMITING ELEMENT AND OPTICAL HEAD UTILIZING THE SAME

BACKGROUND OF THE INVENTION

(1) Field of the Invention

The present invention relates to an aperture-limiting element and also an optical head utilizing the same, and more particularly to an aperture-limiting element which permits a single optical system to be compatible with a plurality of different optical recording media and also an optical head utilizing the same.

(2) Description of the Related Art

Compact Disks (CDs) for music reproduction and CD-ROMs for data file read-only optical disk are recently in general use. These disks have a standardized thickness of 1.2 mm. Also, Digital Video Disks (DVDs) which have large capacity and which can reproduce long-time image sequences such as movies have recently been proposed. These DVDs have the same size as the conventional CDs and CD-ROMs, while having large capacity of data recording in reduced-size and high-density pits.

In optical heads for reproducing the DVD, the optical wavelength is made short as compared with that in the prior art, and the numerical aperture (NA) of an objective lens is made large thus reducing a converged beam spot so as to permit reading pits of the reduced size. Specifically, optical heads for the DVDs use a laser with a wavelength of 635 to 650 nm and an objective lens with the NA of 0.6, while those for the conventional CDs and CD-ROMs use a laser with a wavelength of 785 nm and an objective lens with the NA of about 0.45.

Generally, as the NA increases, there is a high degree of increase in the aberration due to the inclination of the optical disk from the optical axis, and this results in enlarging converged beam spots. It is well known in the art that the aberration depends on the thickness of an optical disk substrate, and that its deterioration can be reduced by reducing the thickness. Accordingly, in the DVD, the substrate thickness is set to 0.6 mm. In practice, two substrates each with 0.6 mm thickness are bonded together to provide a total thickness of 1.2 mm, but the light is reflected by the interface between them, i.e., at a depth of 0.6 mm corresponding to the thickness of one of them. Objective lenses for the DVDs are designed in conformity to the substrate thickness of 0.6 mm.

This means that, when an objective lens for the DVDs is used to converge a light beam on an existing CD-ROM having the thickness of 1.2 mm, no sufficiently converged beam spot can be obtained due to spherical aberration, and the CD-ROM cannot be reproduced. That is, an optical head for the DVDs cannot reproduce CD-ROMs. To preclude this inconvenience, various systems, which are compatible with the DVD and the CD-ROM have been proposed.

FIG. 1 shows a prior art example of system introduced in magazines (i.e., Nikkei Mechanical, No. 473, Feb. 5, 1996, p. 16 and Nikkei Electronics, No. 654, Jan. 29, 1996, pp. 15–16).

Referring to FIG. 1, a light beam from a light source 51 is transmitted through a collimating lens 52, a liquid crystal shutter 58 and a beam splitter 53 and converged by a DVD objective lens 56 to be incident on an optical disk 57. The return light beam is reflected by the beam splitter 53, transmitted through a collective lens 61 and a cylindrical lens 62, and received by a photo-detector 63 which detects a reproduced signal, a focus error signal and a tracking error signal.

In CD-ROM reproduction, the liquid crystal shutter 58 provides NA limitation, that is, it limits the aperture of the objective lens to a small value of about 0.35 from 0.6. The liquid crystal shutter 58 is normally fully transparent. In its "on" state, however, the liquid crystal shutter 58 blocks light at a peripheral portion thereof, while leaving at a center portion thereof a circular transparent region. In this way, of the light collimated by the collimating lens, the light at the peripheral portion that causes the generation of the aberration is blocked, and only the light of the center portion is transmitted, so that the aberration is reduced, thus making it possible to reproduce a CD-ROM.

In the DVD reproduction, as shown in FIG. 2A, the liquid crystal shutter 58 is held "off" to provide a fully transparent state with the NA being 0.6.

On the other hand, in the CD-ROM reproduction, as shown in FIG. 2B, the liquid crystal shutter 58 is held "on" to block light so that an NA value becomes about 0.35.

In general, there are two methods of blocking light by utilizing a liquid crystal shutter in the above way, one utilizing whitening of liquid crystal by electric field application, and the other utilizing rotating of polarization in incident light. In the former method, the obtainable contrast is unsatisfactory. For this reason, the latter method will be described in detail with reference to FIGS. 3A and 3B.

Liquid crystals shown in FIGS. 3A and 3B are generally called twisted nematic liquid crystals.

The liquid crystal 66 is sandwiched between a first transparent electrode 65 and a second transparent electrode 67 in the light transmission direction. In the upstream and the downstream of this structure in the light transmission direction, a first polarizer 64 and a second polarizer 68, respectively, are provided such that their polarization directions cross each other.

In the twisted nematic liquid crystal shown in FIG. 3A, when no electric field is set up in the liquid crystal 66 by not applying a voltage between the first and second transparent electrodes 65 and 67, the light transmitted through the first polarizer 64 undergoes optical rotation due to the liquid crystal 66 and is rotated 90°. The light thus rotated is disposed with 90° rotation with respect to the first polarizer 64 and is permitted to pass through the second polarizer 68.

On the other hand, as shown in FIG. 3B, when an electric field is set up by applying a voltage between the first and second transparent electrodes 65 and 67, the polarized light is not rotated by the liquid crystal 66 and is permitted to pass therethrough as it is. Thus, the light transmitted through the liquid crystal 66 is blocked by the second polarizer 68.

The above prior art aperture-limiting element include at least two polarizers and two electrodes with the liquid crystal intervening therebetween. That is, the element requires a large number of components and tends to be increased in scale. This means that an optical head utilizing this element includes a large number of components and tends to be expensive.

SUMMARY OF THE INVENTION

An object of the present invention, therefore, is to overcome the problems existing in the prior art, and to provide an aperture-limiting element which can be constructed with a reduced number of components, and also an optical head employing the same element.

According to one aspect of the invention, there is provided an aperture-limiting element comprising: a plurality of stripe transparent electrodes spaced apart at a predetermined interval on an electro-optical crystal substrate; and a substantially circular non-electrode area lacking the stripe transparent electrodes at a center portion of the substrate.

The aperture-limiting element may further includes a plurality of phase compensation films each provided between respective ones of the stripe transparent electrodes.

According to further aspect of the invention, there is provided an optical head having a light source, a collimating lens, an aperture-limiting element and an objective lens, the collimating lens, the aperture-limiting element and the objective lens being disposed in the mentioned order in the direction of progress of light emitted from the light source, and a photo-detecting system for detecting return light having been transmitted through the objective lens and reflected by an optical disk, the aperture-limiting element comprising: a plurality of stripe transparent electrodes spaced apart at a predetermined interval on an electro-optical crystal substrate; and a substantially circular non-electrode area lacking the stripe transparent electrodes at a center portion of the substrate.

The transparent electrodes in stripes provided at a predetermined interval on the electro-optical crystal substrate are hereinafter referred to as "stripe transparent electrodes".

With the above construction according to the invention, when a voltage is applied to the stripe transparent electrodes, with the voltage applied to the electro-optical crystal substrate, the refractive index of the substrate is changed in a region thereof where the stripe transparent electrodes are provided. This region alone thus functions as a phase diffraction grating, and incident light proceeds straight and is transmitted through only the central non-electrode region. When no voltage is applied, the refractive index is not changed. In this case, the peripheral electrode region of the substrate functions merely as a transparent region as does the central non-electrode region. In DVD reproduction, in which no aperture limiting is necessary, no voltage is applied to the stripe transparent electrodes. In CD-ROM reproduction, on the other hand, since the aperture should be limited, a voltage is applied.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, embodiments of the invention are described with reference to FIGS. 4 to 6A and 6B.

Figure 1:
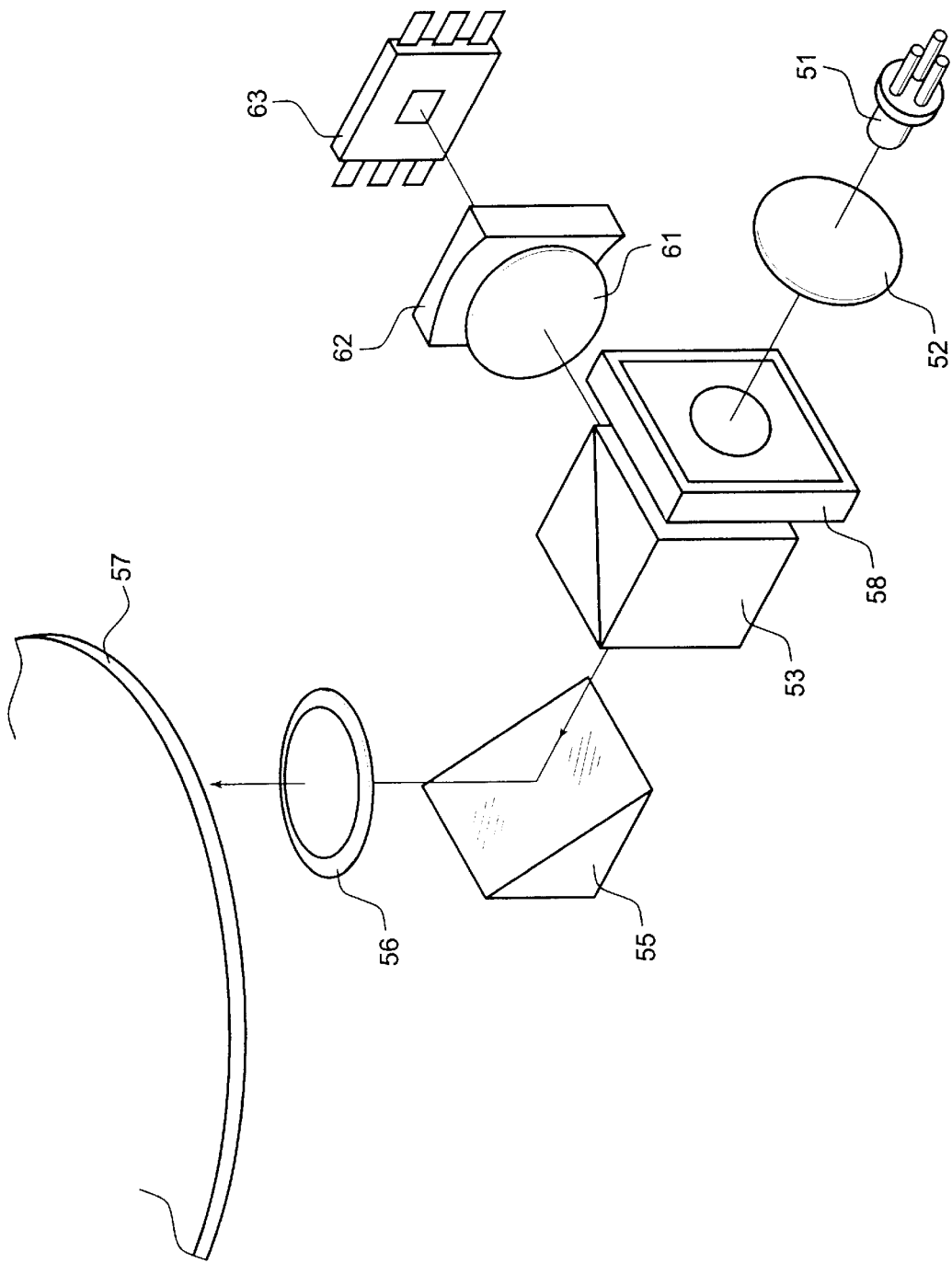
FIG. 1 is an exploded perspective view showing a prior art optical head.
Figure 2A:
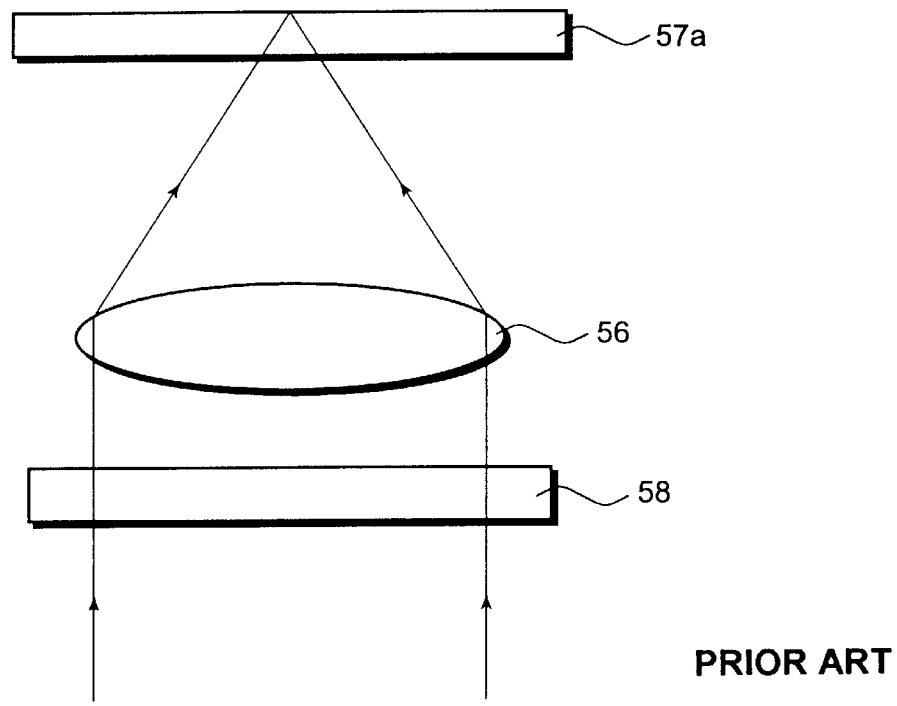
FIGS. 2A and 2B are views showing the operation of an aperture-limiting element, FIG. 2A showing a DVD reproduction state, and FIG. 2B showing a CD-ROM reproduction state.
Figure 2B:
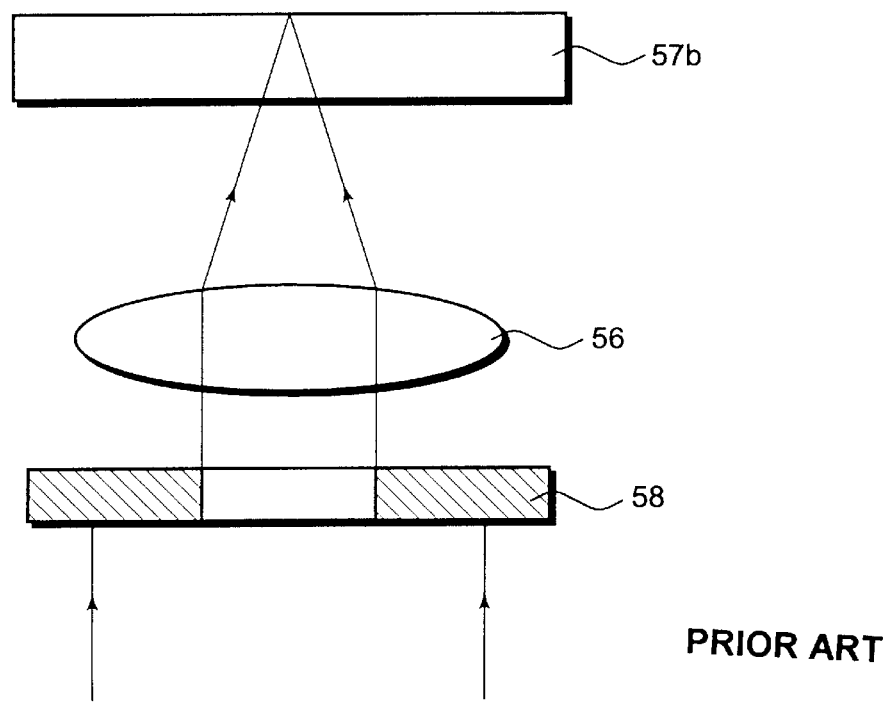
Figure 3A:
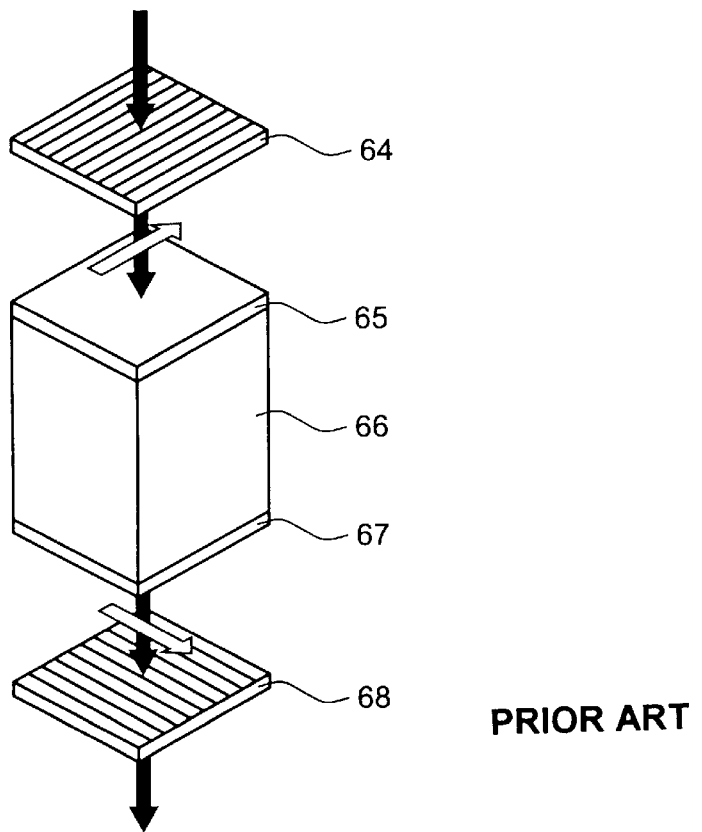
FIGS. 3A and 3B are schematic views showing an aperture-limiting element employing twisted nematic liquid crystal, FIG. 3A showing the element in a state without voltage applied between transparent electrodes, and FIG. 3B showing the element in a state with a voltage applied between the transparent electrodes.
Figure 3B:
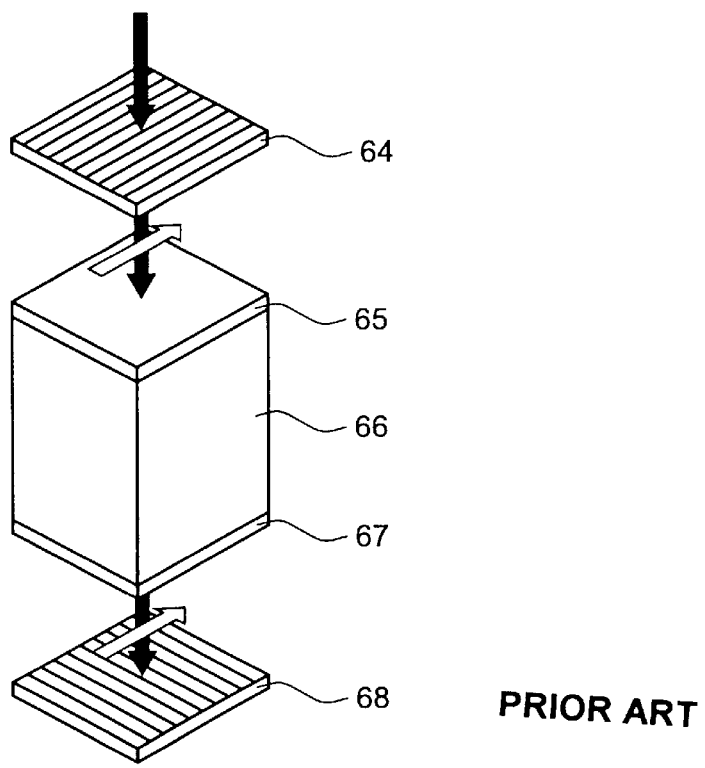
Figure 4:
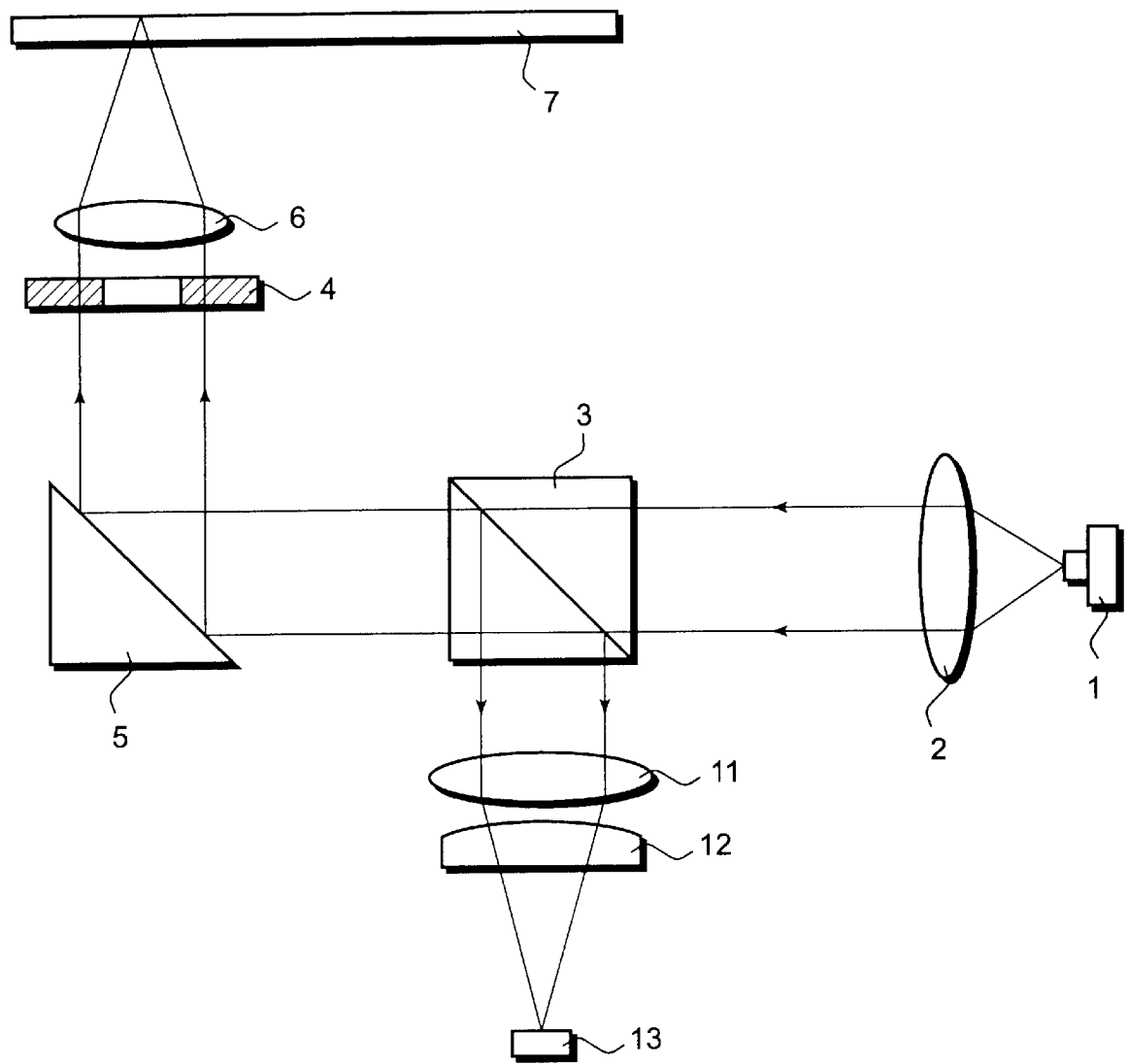
FIG. 4 is a schematic view showing an optical head according to the invention.

Referring to FIG. 4, a light beam from a light source 1 is transmitted through a collimating lens 2, a beam splitter 3 and an aperture-limiting element 4 and then converged through an objective lens 6 for DVD before being incident on an optical disk 7. The return light beam is reflected by the beam splitter 3 and then transmitted through a collective lens 11 and a cylindrical lens 12 before being received by a photo-detector 13 which detects a reproduced signal, a focus error signal and a tracking error signal.

Figure 5A:
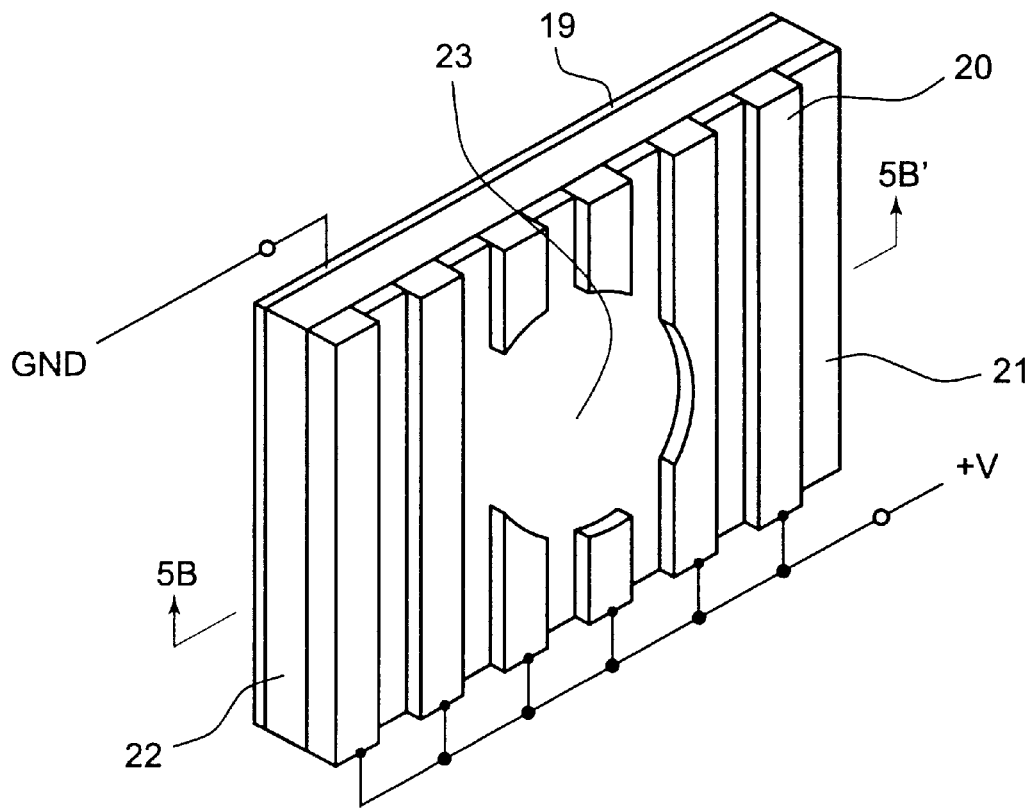
FIGS. 5A and 5B are views showing an aperture-limiting element in the optical head shown in FIG. 4, FIG. 5A being a perspective view thereof, and FIG. 5B being a sectional view taken along line 5B–5B' in FIG. 5A.

FIG. 5A is a perspective view showing the aperture-limiting element 4. As shown, the aperture-limiting element 4 is constructed by arranging on one surface of an electro-optical crystal substrate 22 a plurality of parallel stripe transparent electrodes 20 and providing a substantially circular non-electrode area 23 having no transparent electrode 20 at a center portion of the substrate surface.

Figure 5B:
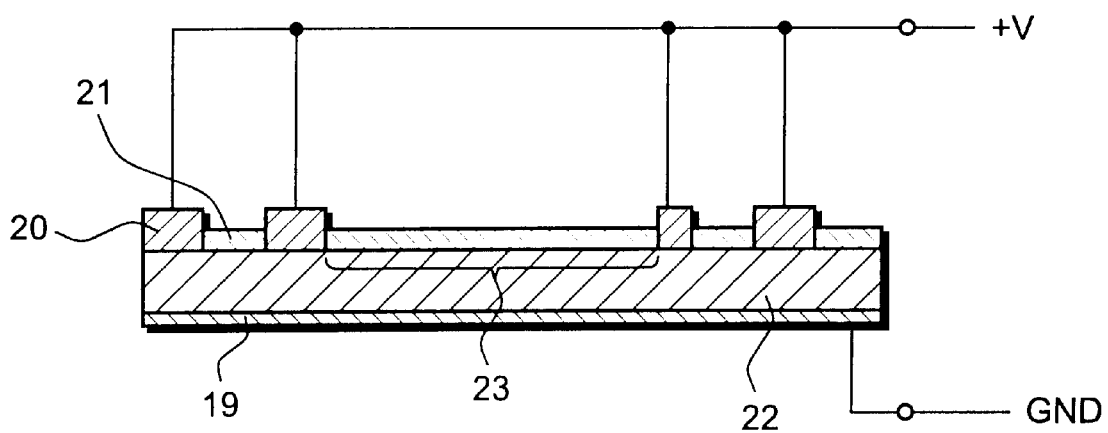

Referring to FIG. 5B which is a sectional view taken along line 5B–5B' in FIG. 5A, a phase compensation film 21 is provided on the exposed substrate surface areas not occupied by the stripe transparent electrodes 20. This means that the phase compensation film 21 covers the entire non-electrode area 23. The phase compensation film 21 has a thickness less than the thickness of the electrode 20, so that it has an uneven light incidence surface formed by the provision of the stripes. The phase compensation film 21 is a dielectric film such as that of glass, and functions to cancel out the phase generated by the refractive index of the stripe transparent electrodes 20.

The stripe transparent electrodes 20 are connected to a power supply for applying a voltage to them in CD-ROM reproduction. A grounded transparent electrode 19 is provided on the entire other surface of the electro-optical crystal substrate 22.

The transparent electrodes 19 and 20 may be formed by using ITO, for instance. The electro-optical crystal substrate 22 may be formed by using $LiNbO_3$, $LiTaO_3$, KDP, etc.

In FIGS. 5A and 5B, a small number of stripes are shown to facilitate the understanding. An actual product, however, has stripes formed at a higher density.

The operation of the aperture-limiting element in this embodiment will now be described. In this embodiment, the aperture-limiting element 4 is disposed on the optical path with its uneven surface side facing opposite the objective lens 6. However, the uneven surface side may well face the objective lens 6.

In the state where the voltage is not being applied to the stripe transparent electrodes 20, the stripe region does not function as a diffraction grating, but functions as a transparent region. When a voltage is applied to the stripe transparent electrodes 20, a potential difference is generated between the stripe transparent electrodes 20 and the opposite side transparent electrode 19. The potential difference thus generated causes an electro-optical effect in the stripe region of the electro-optical crystal substrate 22 on which the stripe transparent electrodes 20 are provided. The electro-optical effect thus generated causes a change in the refractive index. Consequently, the stripe region functions as a phase type diffraction grating to change the optical path by diffracting the light coming straight and being incident. This region thus blocks the incident light in effect. In the central non-electrode region, on the other hand, the incident light proceeds straight therethrough without being diffracted. In this way, the aperture-limiting element fulfills its role.

Figure 6A:
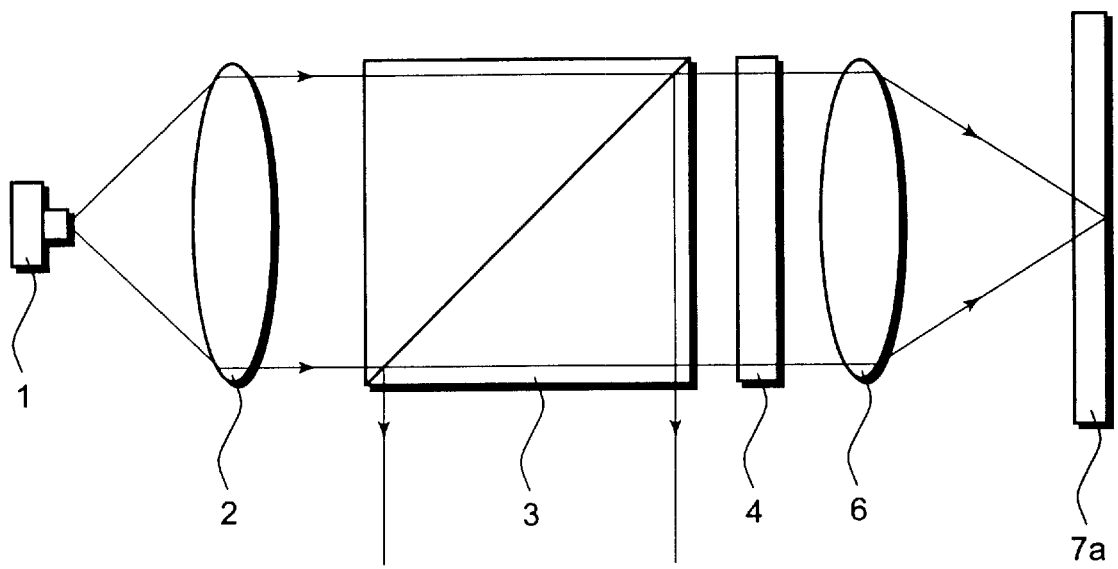
FIGS. 6A and 6B are views showing the aperture-limiting element shown in FIGS. 5A and 5B, FIG. 6A showing the element in a DVD reproduction state, and FIG. 6B showing the element in a CD-ROM reproduction state.

More specifically, in the DVD reproduction, no voltage is applied to the stripe transparent electrodes 20. In this case, as shown in FIG. 6A, the stripe region remains transparent, providing no aperture limitation. Thus, the entire objective lens with a high NA value of 0.6 is used for reproducing the DVD 7a.

Figure 6B:
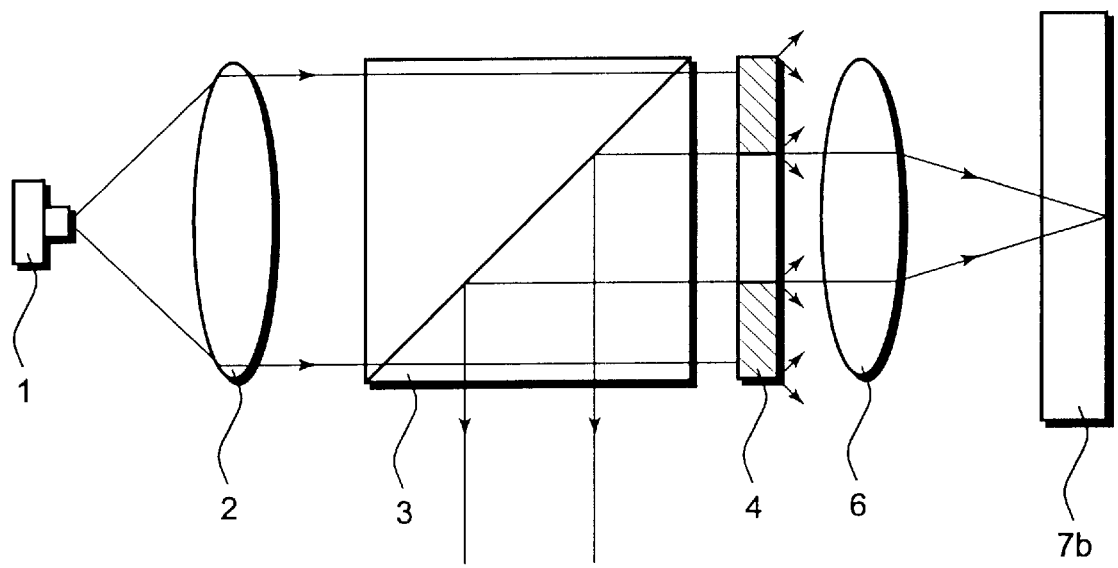

In the CD-ROM reproduction, on the other hand, a voltage is applied to the stripe transparent electrodes 20. In this case, as shown in FIG. 6B, the stripe region functions as a diffraction grating. That is, light incident on the peripheral stripe region is diffracted, and light incident on only the central non-electrode region can proceed straight and be transmitted. This means that the aperture is reduced in effect, so that CD-ROM 7b having the thickness of 1.2 mm is illuminated and reproduced.

As shown above, with voltage application to the stripe transparent electrodes, the refractive index in this region of the substrate is changed, so that this region provides the role of a diffraction grating. Light thus can proceed straight and be transmitted through only the central non-electrode region. The aperture-limiting element thus permits reproducing both DVDs and CD-ROMs with switching of the NA in effect by on-off switching of the applied voltage. Particularly, since the function of the aperture-limiting element can be realized by arranging thin film stripe electrodes on one surface of an electro-optical crystal substrate, and providing a non-electrode area at a center portion thereof, the number of components can be greatly reduced compared to the prior art construction. Since the number of components can be greatly reduced, it is possible to provide an optical head which is inexpensive compared to prior art optical heads.

Moreover, since each phase compensation film is provided between respective adjacent stripe transparent electrodes, the phase generated due to the refractive index of the stripe transparent electrodes themselves can be canceled out.

Figure 7:
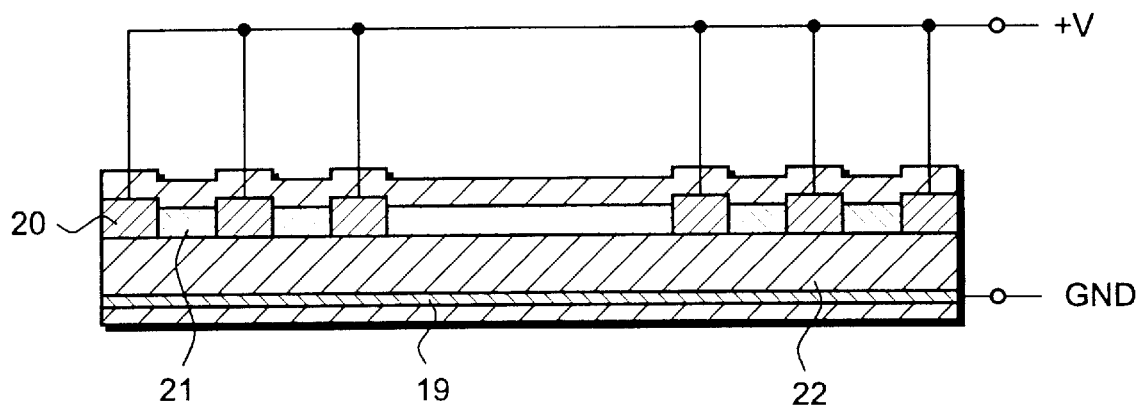
FIG. 7 is a schematic sectional view showing an aperture-limiting element in another embodiment of the invention.

FIG. 7 shows an aperture-limiting element in a different embodiment of the invention.

The aperture-limiting element in this embodiment is obtained by covering the front and back side surfaces of the aperture-limiting element in the preceding embodiment with antireflection films 24. With this arrangement, transmittivity reduction due to reflection can be prevented. The antireflection film 24 may be a single-layer film or a multiple-layer film.

Figure 8:
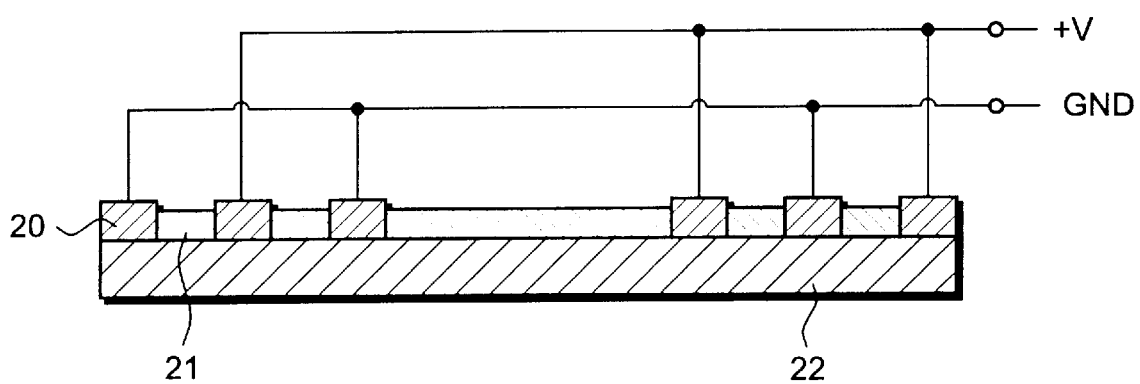
FIG. 8 is a schematic sectional view showing an aperture-limiting element in a further embodiment of the invention.

FIG. 8 shows an aperture-limiting element in a further embodiment of the invention.

The aperture-limiting element in this embodiment is obtained by excluding the back side transparent electrode 19 in the previous embodiment, and the stripe transparent electrodes 20 are adapted such that, in CD-ROM reproduction, voltage is applied to every other ones of them while the other ones are grounded. Again with this arrangement, the same functions and effects as obtainable with the aperture-limiting element shown in FIGS. 5A and 5B can be obtained. Besides, since the back side transparent electrode 19 is dispensed with, the number of components can further be reduced.

As has been described in the foregoing, the advantage achieved with the construction according to the invention is that, with a voltage applied to the stripe transparent electrodes, the refractive index in this region of the electro-optical crystal substrate is changed, so that this region functions as a diffraction grating. Light thus can proceed straight and be transmitted through only the central non-electrode region. The aperture-limiting element thus permits reproducing both DVDs and CD-ROMs with the switching of the NA in effect by on-off switching of the applied voltage. Particularly, since the function of the aperture-limiting element can be realized by providing thin film stripe electrodes on one surface of an electro-optical crystal substrate except for a central non-electric area, the number of components can be greatly reduced compared to those required in the prior art construction. Since the number of components can be greatly reduced, it is possible to provide an optical head which is inexpensive compared to prior art optical heads. Moreover, the phase compensation film which is provided on areas not occupied by the stripe transparent electrodes, can cancel out the phase due to the refractive index of the stripe transparent electrodes. Thus, it is possible to provide a novel and very excellent aperture-limiting element and an optical head using the same.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An aperture-limiting element comprising:

a plurality of stripe transparent electrodes spaced apart at a predetermined interval on an electro-optical crystal substrate; and a substantially circular non-electrode area lacking said stripe transparent electrodes at a center portion of the substrate.

2. The aperture-limiting element according to claim 1, which further includes a plurality of phase compensation films each provided between respective ones of said stripe transparent electrodes.

3. The aperture-limiting element according to claim 1, which further includes a transparent electrode provided on an undersurface of said electro-optical crystal substrate.

4. The aperture-limiting element according to claim 1, which further includes antireflection films respectively covering a front side surface and a back side surface of said aperture-limiting element.

5. An optical head having a light source, a collimating lens, an aperture-limiting element and an objective lens, said collimating lens, said aperture-limiting element and said objective lens being disposed in the mentioned order in the direction of progress of light emitted from said light source, and a photo-detecting system for detecting return light having been transmitted through said objective lens and reflected by an optical disk, said aperture-limiting element comprising:

a plurality of stripe transparent electrodes spaced apart at a predetermined interval on an electro-optical crystal substrate; and a substantially circular non-electrode area lacking said stripe transparent electrodes at a center portion of the substrate.

6. The optical head according to claim 5, wherein said aperture-limiting element further includes a plurality of phase compensation films each provided between respective ones of said stripe transparent electrodes.

7. The optical head according to claim 5, wherein said aperture-limiting element further includes a transparent electrode provided on an undersurface of said electro-optical crystal substrate.

8. The optical head according to claim 5, wherein said aperture-limiting element further includes antireflection films respectively covering a front side surface and a back side surface of said aperture-limiting element.

* * * * *